United States Patent
Yair et al.

(10) Patent No.: US 8,055,377 B2
(45) Date of Patent: Nov. 8, 2011

(54) ONLINE CONTROLLED PICKING IN A WAREHOUSE

(75) Inventors: Ben-Shaul Yair, Hadera (IL); Orit Harel, Kadima (IL); Ziv Holzman, Tel Aviv (IL); Joachim Epp, Zuzenhausen (DE); Malkiel Hadari, Hod-Hasharon (IL)

(73) Assignee: SAP Aktiengesellschaft, Walldorf (DE)

( * ) Notice: Subject to any disclaimer, the term of this patent is extended or adjusted under 35 U.S.C. 154(b) by 882 days.

(21) Appl. No.: 11/663,399

(22) PCT Filed: Sep. 22, 2004

(86) PCT No.: PCT/EP2004/052274
§ 371 (c)(1),
(2), (4) Date: Apr. 9, 2008

(87) PCT Pub. No.: WO2006/032303
PCT Pub. Date: Mar. 30, 2006

(65) Prior Publication Data
US 2008/0215179 A1    Sep. 4, 2008

(51) Int. Cl.
*G06F 7/10* (2006.01)
(52) U.S. Cl. ........ 700/216; 700/215; 700/214; 414/273; 705/28; 707/999.01; 707/999.107
(58) Field of Classification Search .................. 700/213, 700/214–216, 217, 228; 705/28
See application file for complete search history.

(56) References Cited

U.S. PATENT DOCUMENTS

| | | | |
|---|---|---|---|
| 5,434,394 A * | 7/1995 | Roach et al. | 235/375 |
| 6,011,998 A * | 1/2000 | Lichti et al. | 700/230 |
| 6,289,260 B1 * | 9/2001 | Bradley et al. | 700/216 |
| 6,505,093 B1 * | 1/2003 | Thatcher et al. | 700/216 |
| 6,539,386 B1 * | 3/2003 | Athavale et al. | 1/1 |
| 6,622,127 B1 * | 9/2003 | Klots et al. | 705/28 |
| 7,031,801 B1 * | 4/2006 | Hodge et al. | 700/213 |
| 7,110,855 B2 * | 9/2006 | Leishman | 700/216 |
| 7,158,856 B2 * | 1/2007 | Sheehan et al. | 700/216 |
| 7,243,001 B2 * | 7/2007 | Janert et al. | 700/214 |
| 7,801,640 B1 * | 9/2010 | Hodge et al. | 700/213 |
| 2002/0169698 A1 * | 11/2002 | Chien | 705/28 |
| 2003/0009396 A1 * | 1/2003 | DeVries et al. | 705/28 |
| 2004/0004119 A1 * | 1/2004 | Baldassari et al. | 235/384 |
| 2005/0075891 A1 * | 4/2005 | Arguimbau, III | 705/1 |
| 2005/0102203 A1 * | 5/2005 | Keong | 705/28 |

FOREIGN PATENT DOCUMENTS

WO   WO 0217537 A2 *   2/2002

* cited by examiner

*Primary Examiner* — Gene Crawford
*Assistant Examiner* — Kyle Logan
(74) *Attorney, Agent, or Firm* — Blakely, Sokoloff, Taylor & Zafman LLP

(57) ABSTRACT

A computer-implemented method of controlling picking operations of a number of users in a warehouse, wherein goods are located at source locations, each picking operation comprising: an operation of preparation, wherein, at the source location, the good is introduced in a handling unit, HU, an operation of placing the HU on a picking equipment, the picking equipment being a tool for transferring the HU, an operation of transferring the HU to the destination location, wherein a sequence of picking instructions are presented online individually to the number of users via instruction presenting means which are associated with the respective users, each picking instruction specifying the HU to be transferred, the equipment to be used, and the first and second position, whereby execution of each of the picking operation steps is controlled by online data verification such that a subsequent picking operation instruction may be changed, and presented to the users via the instruction presenting means depending upon result of the verification.

19 Claims, 11 Drawing Sheets

ONLINE CONTROLLED PICKING IN A WAREHOUSE

This is a non-provisional application of International Application No. PCT/EP2004/052274, filed Sep. 22, 2004.

BACKGROUND OF THE INVENTION

This application relates to warehouse management in general and more particularly to controlling of picking operations in a warehouse in the framework of a warehouse management system.

STATE OF THE ART

The picking operation is a critical process in the warehouse. It needs to be accurate, executed with high performance in order to achieve an on time delivery. Further, the picking process flow should be flexible and easy to be modified in order to fit to various needs of different organizations. The picking related functionality has to serve the user (which is the picking person) and the supervisor.

SUMMARY OF THE INVENTION

In general, in one aspect, this invention provides methods a computer-implemented method of controlling picking operations of a number of users in a warehouse, wherein goods are located at predetermined source locations, each picking operation comprising:
  preparation, wherein, at the source location, the good is introduced in a handling unit, HU, the HU being a container for storing and transporting the good,
  placing the HU on a picking equipment, the picking equipment being a tool for transferring the HU,
  transferring the HU to the destination location,
  wherein a sequence of picking instructions are presented online individually to the number of users via instruction presenting means which are associated with the respective users,
  each picking instruction specifying the HU to be transferred, the equipment to be used, and the first and second position,
  whereby execution of each of the picking operation steps is controlled by online data verification such that a subsequent picking operation instruction may be changed, and presented to the users via the instruction presenting means depending upon result of the verification.

Advantageous implementations can include one or more of the following features.

A number of picking areas may be defined in the warehouse, each picking area comprising a predefined group of locations, and each user is assigned to work in at least one of the picking areas.

Advantageously, the picking areas may be defined according to the type of instruction.

According to all embodiments of the invention, the instruction presenting means being one of RF device, PDA, computer screen, and paper list, paper tag.

For a given picking area, a bundle of picking instructions may be produced in sequence, which are assigned to one user to be executed.

For a given picking area, a bundle of picking instructions may be produced in sequence, which are assigned to a group of users to be executed.

The instructions of the bundle of instructions may be sorted into a picking sequence to be executed by a group of users.

Furthermore, a timestamp may be recorded when a bundle is assigned to a user, or when an instruction is executed by a user.

For specific picking instructions, specific HUs to be used may be proposed to the user.

To each of the HUs an ID may be assigned which is representative of the type of the HU, the ID being arranged on the HU.

However, according to one embodiment of the invention, the proposed HU may optionally be overridden by the user.

According to a further embodiment of the invention, the method comprises further:
  in a first operation, the user is directed to the source location,
  in a second operation, a confirmation of the user to be at the correct location is received from the user,
  in a third operation, a picking instruction is displayed to the user,
  the picking instruction including material number, HU number, unit of issue, pack-with, position on the cart for the material to be placed in, and quantity,
  in a fourth operation, receiving a verification of the user that the material is present at the source location,
  in a fifth operation, receiving a confirmation that the material is picked by the user,
  in a sixth operation, instructing the user to count at the source location the quantity of remaining material, and
  in a seventh operation, recording the destination location where the user moved the HU.

Furthermore, if the HU is not large enough for the whole quantity of material to be picked, the system may receive information that the HU is full, and after recording the destination location of the HU, a further HU is created to be used for the remaining quantity of material.

The verifications may be performed using scanning of barcodes on the material.

In a further embodiment of the invention, exceptions are be recorded, the exceptions being representative of at least one of
  insufficient location
  insufficient stock
  wrong part in location
  mixed stock
  overfill for scrap.

Yet further, picking instruction of the picking sequence may be skipped over by the user, and re-inserted at a later position in the picking sequence.

Further, if an exception is received reporting that a location is empty, no further instructions to users to go there are issued.

A confirmation may be received issued by the user upon completing a bundle of picking operations.

In particular, the invention comprises also computer systems for performing the inventive methods.

Furthermore, the invention comprises computer-readable storage media comprising program code for performing the inventive methods, when loaded into a computer system.

Some of the advantages of the RF Picking transactions according to the invention are that the scenarios are improved by enhancing the level of flexibility provided to the user during execution. For example:
  Introduction of new Pick-HU is enabled at any stage of the process. Splitting of TO is allowed during execution due to short capacity of the Pick-HU.

Furthermore, batch verification is enabled.

Moreover, the recovery process is improved. A resource can continue warehouse order execution from the point he stopped as if nothing happened. The user may be logged on to multiple resources simultaneously, therefore he may choose the resource he would like to recover and get the appropriate warehouse order accordingly.

Exception handling and the follow-up process are improved by the possibility to trigger asynchronously follow-up actions using the exception handling tool. In addition, the exception scenarios of Bin denial and pick denial are fully supported.

DETAILED DESCRIPTION

The basic functionalities of the system according to the present invention are as follows: Request warehouse order (warehouse order assignment);
  Execution of warehouse order;
  Provide execution instructions;
  Confirm execution and exceptions;
  Enable split warehouse order;
  Enable re-sequence warehouse order;
  Enable skip of pick items;
  Enable integration of inventory count with the warehouse order execution (in the location the item is picked from);
  Recovery of assigned warehouse order for which execution was started and not completed.

Figure 1:
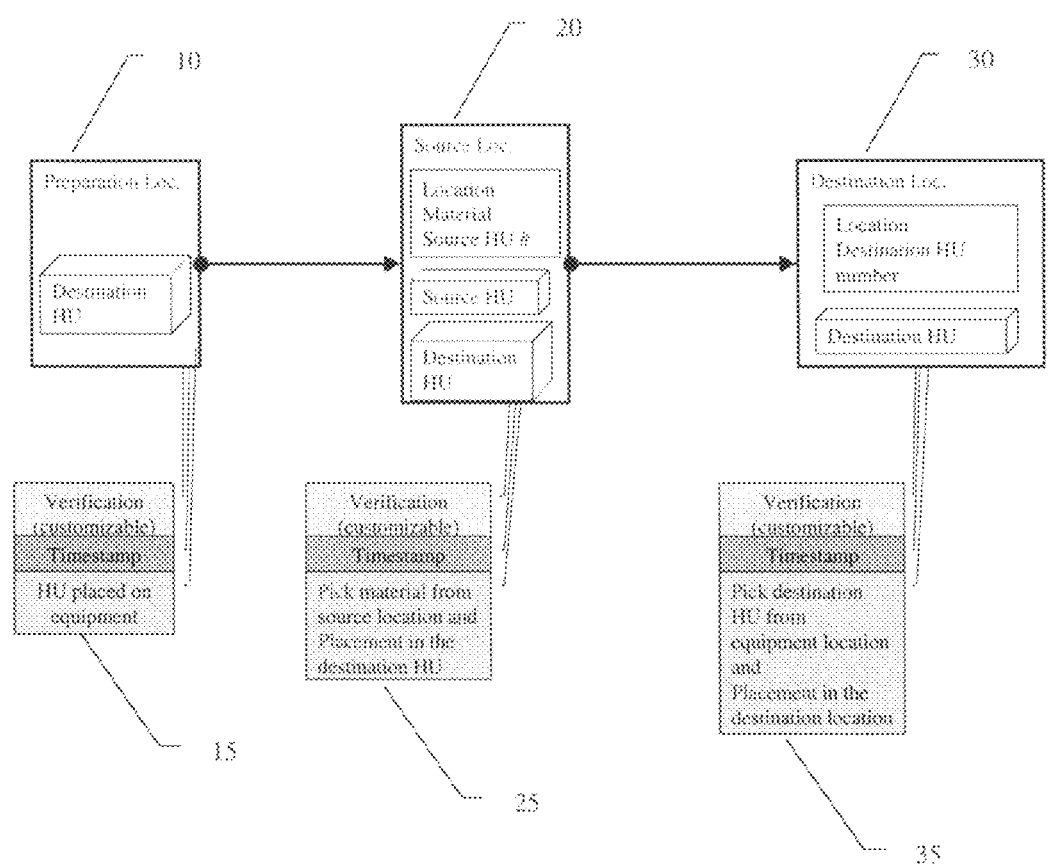
FIG. 1 gives a general overview of the processing stages of the present invention.

Before explaining in detail the embodiment of FIG. 1, some terms and functions of the system according to the present invention are given.

A handling unit (HU) includes packaging material and the materials contained therein.

HU type is a code used to identify a type of pallet or other type of goods container, for example a euro pallet, or a metal box. These containers are used to store and transfer goods.

Transfer order (TO) is an instruction to move materials from a source storage bin to a destination storage bin, or from bin to resource, and from resource to bin within a warehouse complex at a specified point in time. A transfer order includes items that contain the quantity of the material to be moved and specifies the source and destination storage bins. A transfer order can be created based on a customer delivery, or a posting change notice.

A predefined group of storage bins (locations) in a warehouse constitute a pick area. The same location(s) can be assigned to one or more pick areas. A pick area can be defined by order type for more efficient picking. Users may be assigned to work in a given pick area.

Execution area is a group of storage bins that belong together from an execution point of view, for example: Bins are grouped together in an execution area for putaway. For each execution area a putaway/picking path can be defined.

Bundle, Bundling: By applying predetermined bundling rules for a given pick area, a group of instructions is produced in sequence for that pick area. These tickets will be assigned to an order user to be worked.

Warehouse order (WO) is a bundle which groups transfer orders (TO).

Warehouse process type (WPT) is a parameter which influences the way an item is treated in warehouse processes, e.g. emergency, replenishment, or scrap. WM-request (WMR) is a document, which can be received by or created in the Warehouse Management Engine. The warehouse request is a request for the warehouse to handle a quantity of a material, which should be picked, putaway or just for a posting change. The origin of a warehouse request is normally a process, which started in another system. For inbound processes this would be a purchasing system, for outbound processes this would be a sales order system. The WM-request can also be used to trigger warehouse internal moves, which do not have a source in another system. The WM-request will be used to build waves. To fulfill warehouse requests, e.g. transfer orders can be created based on the requests.

Pick denial: No stock is found in the warehouse to fulfill the order line due to exception situation.

Bin denial: No stock is found in the picking bin to fulfill the WM-request line due to exception situation, but there is available stock in the warehouse in another bin.

The means that the user uses to display the picking instruction is called a picking device. Examples are radio frequency (RF) terminal, paper in different format.

The data media that is presented to the user to execute the picking process from the bins/locations in the warehouse is called pick order. This order can be represented to the user via RF device, PDA, or paper (pick list or labels). Basic pick order data are what to pick, from where to pick, how much and where to place it.

Verification is a comparison process in a warehouse to compare system data with physical data. It is usually done with RF scanner to scan bar-coded data label resides on a physical element like bin, Material, HU etc. It can also be done on a desktop to scan data from a paper like pick list or pick label.

Queues define movements by which the work (e.g. TOs/bundles) in the warehouse is managed and assigned. The queues should be defined based on qualifications and managerial rules that will reflect the required warehouse operation behavior. The queue definition is comprised of physical areas in the warehouse (e.g. picking area) physical objects to be moved (e.g. HU type) and WM process type. All the parameters are optional. For example, queue can be defined for a specific picking area, which is a source execution area without a specific indication of destination storage type, WM process type and HU type.

The TOs/bundles are assigned to queues. Each user/equipment can be assigned to multiple queues.

Destination HU is the HU which picked materials should be placed in.

Each equipment is represented as a bin in the warehouse to enable stock visibility during stock movement.

Picking instructions refer to the data media that is presented to the user to execute the picking process from the bins/locations in the warehouse. This instruction can be represented to the user via RF device, PDA, or paper (pick list or labels). Basic picking instruction data are what to pick, from where to pick, how much and where to place it.

Any hazardous material requirements need to come from the material master. The handling issues are recommended from the data set up to assure that hazmat requirements are adequately met. This needs to be in Picking, Packing, Shipping.

Picking instructions include a handling unit type, number of HUs, special instructions, material, quantity, carrier, route, customer code, packing lane or staging area (if applicable), bundle number, etc. These picking instructions are displayed on both RF and non-RF tags (including a header tag). This also includes but is not be limited to, the customer order number, order or operational class.

After the system has bundled the picking instructions (tickets), sorted them into a picking sequence, prioritized them, and the bundles have been assigned (by default) to a group of users, they are presented to the WM users (users) for the picking execution.

The supervisor has access to make assignments and direct issuance of bundles to users from any terminal based on authorizations. The input data for bundling assignments are:

Bundle priority—the bundle priority that was determined by the pick completion date/time. If there are more bundles with the same pick completion date/time it is sorted by wave release time and then by bundle number. The bundle number is a system generated number that associates all TO lines within a bundled unit of work.

Available users by pick area—The user would automatically pick up the bundles for the area he is assigned or would pick up those bundles that were manually assigned to him by his supervisor. The bundles manually assigned to him could be for multiple pick areas.

Equipments requirements—like fork lift, pallet jack, pick cart types etc. For an RF environment, the type of equipment the user will be using may be assigned to the picking area and/or employee, the equipment may also be linked to the HU type. This relationship is pre-determined in the bundling rules in order to prevent having to change equipment during bundle picking. This is optional in configuration. It is not mandatory to relate the equipment to the picking area and HU types.

Assigned picking handling unit type—the type of container that is to be used to pick into.

Container license plate (HU Number)—HU number (unique number). It can be:
- a fixed plate on the handling unit with a number on it (returnable container). In this case of fixed HU shipped to a customer than the history of this Customer HU should be stored in the data warehouse for manual tracking.
- a dynamic number that can be assigned from system sequenced number as hard tag or printed at the time of picking.

Consolidation/shipping staging location—This is the destination location for the bundle, it can be the packing station if consolidation is required. It can be the shipping staging area, loading dock, or truck, if the user is loading his material directly on to a truck. If the bundle is a 'pick-pack' bundle which means a bundle that requires no packing, and is going directly to the shipping staging area, the HU contents list will need to be printed at the time the HU is closed.

If the bundle is a 'direct load' bundle (for instance, filter element HUs or roller containers), the shipping label, HU contents list, and other shipping documentation may be printed at the time the bundle is checked out by the user. This 'pick-load' bundle is done in one operation within the system. The documents may be printed at the time the bundle is checked out (start of bundle) or at the end of picking (this is configurable at the pick area level).

Assign bundle to user (automatic or manual)—The user receives all information and/or paperwork associated with the bundle.

When a user requests work from the system, a bundle or work instructions goes to be assigned to the user. This bundle will be issued to him by the system or by his supervisor (using the system). The picking instructions are expedited to the user via:

Paper that includes: Pick list or labels.
RF device.
Mixture of the both methods.

In an RF-environment, the system assigns the next bundle to the user, based on the bundles priorities when the user is logged on in order to get the picking instruction.

In a non-RF environment (pick list or labels), a person manually assigns a bundle to the user from the desktop screen and tells the system to which user the bundle is assigned to (bundle check out).

The same appears in RF+paper environment. A bundle is assigned to a user by scanning the header of a bundle.

A timestamp can be recorded when the bundle is assigned to a user. In the non-RF environment, an employee is able to check out a bundle and assign himself to it without having to logoff the previous user and log in with his user id in order to associate himself with that bundle. It is as simple as one screen that any employee can walk up to and scan in the pick area, the bundle ID, and his logon ID. If the bundle ID is unique to the pick area, then the pick area is not needed.

The user receives all information and/or paperwork associated with the bundle. In an RF-environment, the first instruction is displayed. In a non-RF environment instructions are printed on a paper. In the paper mode, there is a "bundle header" that includes information about the bundle like:
bundle number
HU type (Tote, Carton etc.)
number of HU types
equipment type
wave number
date and time stamp (expected pick completion date & time)
number of lines, weight, cube
destination location—pack station, shipping staging
number of HU # labels This information is printed on a barcode format (primarily the bundle #) and is configurable at the pick area level as to what information is printed on the header tag.

Material (country of origin (if applicable), description, weight, dimensions)
Quantity to be picked
Special instruction for the material—this instruction comes from material master or Commercial (customer order)
Pick HU number and physical position on the cart that it should go in to. This makes it easier for the user to put material into its assigned HU
Route, dealer/customer code, bundle number, pack lane, pack-with, customer order information like order # and customer location, etc.

This information is available to be printed in barcode format for paper pick instructions and would be configurable at the pick area level as to what information is printed for each pick line.

The user identifies the handling unit (pick/pack/ship): The HU being picked into can be a pick, pack, or ship HU. When the pick of multiple materials from multiple picking locations is required, the user may take the HU type proposed by the system to put in the picked material. This handling unit type is pre-determined by the picking instruction. The HU type is a system recommendation and can be overridden by the user. This override situation may occur in case that the HU type is not available, or for any other reason. The user might need to override the recommendation and inform the system about a different picking handling unit type that he has chosen.

This handling unit is identified and the handling unit number is introduced to the handling unit type. This could either be a license plate or system generated HU number. If there are more then one handling unit type planned in the bundle than this information is also introduced to the user as a 'position' where each of the HUs will reside on the order filling cart.

The HU number can be assigned to a HU type by the system or a user can insert the HU number from the pre-printed label into the system. If it assigned by the system, the user should have the ability to override this HU number suggested by the system in situations where the user may need to place an oversized part into another HU destined for the same customer I.e. cannot fit in position 15 and place it in position 16.

If the system suggests 6 totes but physically only has 4 totes and 2 wire baskets available, the user may override the handling unit type for the 2 wire baskets. If a HU type is chosen by a packer, the system may recognize if it is a valid HU type for that route. For example, if the routing is Fed Ex or UPS, a wire basket might cause weight to exceed routing parameters and should not be allowed.

The system may provide a list of the allowed HUs, starting with the one that is next best fitting based on route.

Also if a pick ticket is lost, there is an ability to re-print this tag. In this case, "re-print" is printed on this tag, as well as on the record for the tag retained in history. If the original tag is located later, it has a status of "void" or "invalid" and is recognized as such. This prevents tags from being double-filled. These reprints record who requested it and when it was requested (date/time).

If the user picks a full load (full pallet picking) from a location than this process is not required. The system uses the HU number that is on the pallet. If not, re-print or generate one.

The user starts picking cycle: When the user gets the first pick instruction he may decide to start the picking path at a different point than the recommended one. In an RF environment the system allows him to identify the start point himself as well as the direction (ascending or descending). When the user starts the picking of a bundle a date/timestamp is recorded in the system.

Pick Material.

Move to first/next pick front.

System directs the user to the next picking location. The user physically moves there.

User confirms to be at correct location (optional): The user confirms the source location from where the material should be picked. This is not mandatory, but the system supports both scenarios. This is configurable at the employee level.

Provide picking instructions to the user

Picking instructions are displayed to the user: The picking instruction includes material number, HU number, UOI (unit of issue), pack-with, (logical position on the cart) position on the cart for the material to be placed in, and quantity. Also route dealer, etc. may be required but this information is not mandatory. The data for display may be controlled using the system setup.

Also if there are additional instructions in the material master and/or the customer master for this material the user will have an indication and will have the ability to display this information. These instructions are in a text format.

Verify/confirm material in location (optional): The user is instructed to verify the material in the location. In a non-RF environment it is done manually by comparing the data on the carton in the location and the paper. In RF environment the user scans the material and the system checks that the correct material is in the location and it is in a saleable condition. This option is not mandatory and may be a system setup in the pick area level or employee level. Verification includes optionally barcode-scanning ability. As an example, a material may be flagged "scan label" Y/N digit for the material number in the previously scanned location.

Pick the Material: The user physically picks the required material quantity and places it into the handling unit. After the physical picking he might be told by the system to perform a zero/under threshold location count.

In an embodiment of the present invention, remaining quantity in a location is considered. The user will be instructed to count the location in one of the following situations:

Zero check, when quantity in a location comes to zero,

Threshold check, when location quantity comes to the threshold level.

The threshold quantity can be set in the picking area level or the material master level. Material level may override the pick area level. Inventory count requirement for kick off is based on an absolute quantity value. The user will have to report actual quantity in the location and the system informs of the difference in the location. The user and system (configurable at a pick area level—automatically) may have the ability to make a location available for new material when picked to zero. Confirm the material in correct handling unit is optional.

In a RF environment the user scans the pick handling unit into which he has to put the material into. If the user puts it into the wrong pick HU, the system instructs him to take it out again, and to put it into the correct handling unit.

A similar manual process applies to a non-RF-environment but the user checks it manually (carton number on pick slip for multi-order picking into multiple cartons).

Send handling unit to consolidation/shipping (initiated by the user): In case the next material quantity does not fit into the HU (not enough room), and the picking lines for the handling unit is not yet completed (some more materials are planned for this HU), the user, at this point, may want to move the handling unit to consolidation/shipping area. The user has the ability to inform the system that the pallet is full. The system directs the user to place the HU in the destination location.

Also the user has the ability to inform about a pallet when there are no more picking operations but the system assigned more HU than actually needed. This situation can be recorded since this situation is not matching the bundling rules. The data required is quantity, material and handling unit.

Expected HUs, actual HUs: The user needs to record where he moved the handling unit containing the material. Secure new handling unit for the remaining material. After the old handling unit was placed in the destination location the user will create a new handling unit to the remaining material that was initially planned for the old HU closed by the user.

Optionally, the system has the ability to document all sort of exceptions reported during the picking activity. The following types of exceptions can be processed:

Location inaccessible

Insufficient stock

Wrong part in location

Mixed stock

Overfill for scrap all and any other order types where this is allowed

Damaged/Non conforming.

The system reacts accordingly e.g. direct user to alternative pick location, notify quality control and initiate inventory count. This is an RF functionality for great amount of parts. In a non-RF environment transactions can be used to report exception in the desktop.

Sort new pick location into the remaining pick path (location unavailable): The user is unable to perform the pick because the current location is unavailable, and further alternative pick location(s) are available ahead on the pick path. The employee may input an exception code, location unavailable, and the system will place the pick to the new position in the pick path. In a non-RF warehouse, the 'skipped' pick tickets would be submitted to supervision or delivered to the 'Dispatch Desk' for reassignment to a user. Sort new pick location into the remaining pick path (no material).

The user is unable to perform the pick because no material was available in the current location is unavailable, and further alternative pick location(s) are available ahead on the pick path. The employee may input an exception code, location unavailable, and the system will place the pick to the new position in the pick path.

Put new pick at the end of the pick path: If the new alternative location is behind (user passed it) the current location and in case of an inaccessible location the new pick line will be sorted to the end of the pick path. In a paper environment when the picking has not yet been completed the label may be kept for a later use. Or handed over to supervision or delivered to the 'Dispatch Desk' for reassignment to a user. This may be configurable on pick zone level.

Prevent future users from going to empty location: If the user reports the location as empty, the system should prevent other users from going to this location for picking.

The following processes are then executed:
1. The first user reports an empty location exception
2. System record this exception and:
   Block this location until additional material is put away. Depending on your stock removal and stock placement strategies, the location could be made available for new material. (e.g. for dynamic primaries after approval from cycle counting bin blocking could be removed or last pick against this particular bin is checked out in the system)
   Creates inventory count
   New bin is allocated for picking
   i. First in the same picking area to rebundled
   ii. If not found in the same picking area cancel the current pick line than re-schedule work
   iii. If not found in the facility sent a bin denial message to the commercial (pick record denial situation).

Optionally, the following subsequent actions are executed (as a matter of system setup):
3. Pick lines pointing for this bin in other bundles are automatically cancelled and redirected to another location if possible. If not possible a message is sent to a supervisor monitor.
4. A message is sent to a supervisor monitor.
5. Bundles not yet assigned to user are flagged, if the bundle is already assigned no changes are made to the bundle anymore
6. Pick line is sent to an exception bundling.

Record denial (pick line denial): When no stock is found in the warehouse to fulfill the order line a message should be sent to the Materials Management (MM), Commercial (CM) in order to resource the material. This must be performed as quickly as possible to ensure delivery of the order line to the customer from another warehouse.

Release to pool for later inclusion in new bundle: Due to the exception situation the outstanding pick(s) line is put back to the pool of unperformed picks, which are not yet assigned to a user. This order line has to be assigned to a new wave, the wave has to be released and the line has to be included into a bundle. It might be desired to automatically do all this to speed up the re-pick. Confirm Picking User confirms actual quantity picked and actual location picked from.

In an RF environment the start and the completion of each individual pick may be recorded with a timestamp. When the last pick is executed the user informs system about the end of the picking activity. Non-RF may allow confirmation of entire bundle without scanning each individual TO. This is configurable on pick area level.

In a non RF-Environment, the user or supervisor tells the system about performed picks, occurred exceptions etc. Time stamp include start and finish of bundle where each line would carry the finish time of the bundle. At this point in time, the same questions and decisions have to be run through (for each line), as is depicted on record exception process.

In a non RF-Environment, the user initiates replenishment, if not all the materials were available for picking. The replenishment is triggered by notifying supervisor with specific form or data entry on terminal. In an RF environment, the user inputs an exception that triggers a replenishment (may be self actuated). This can be triggered manually via terminal depending on how the facility wants it set up.

Confirm bundle finished: A timestamp is recorded in the system. The user can now get another bundle assigned. This confirmation is recorded automatically as soon as the last pick in an RF-environment is performed. Without RF or if the user stopped picking of the bundle without performing all picks (e.g., end of shift), a manual feedback to the system is required. Supervisors may have the ability to split bundles (bundle rules are not rechecked) at any time to facilitate completion of a route.

The system should may visibility of partially picked bundles so they can be re-assigned or merged with other partially worked bundles (bundle header checks and bundle rules are not rechecked) to another user. Otherwise it will have to close out a partial bundle and create a new bundle for the remaining items. These are manual transactions.

In RF environment re-assigned of an incomplete bundle to another user may be done automatically only after the first user report that he stopped working on this bundle to the system.

Put remaining lines back to pool: If a user was not able to perform all picks (e.g. too much work until end of shift) the remaining picks are put back to the pool of unpicked lines. The bundle could be forwarded on to another employee or the bundle could be sent back to the queue for a new user to be automatically assigned.

The invention provides for configurability, personalization, and customizing of the system. In particular, the picking area can be created by operational class. Picking location can be assigned to area, and the picking path can be determined.

Process of assigning locations into an efficient picking path:

Specify area, aisle within area, section within aisle and level within section. Area and aisle can be specified. No entry in section and level assumes all sections and levels within the aisle(s) specified. Aisle—start stop and direction in aisle, Section—start stop and direction in section. Specify whether to use the odd, even, or both sets of locations in an aisle. Specify whether to always process sections in the predetermined order or to alternate from High-to-Low then Low-to-High when changing from one aisle to the next. Level—start stop and direction in level.

Printers may be determined for each picking area. There might be different formats and therefore maybe different printers needed.

A pick list may be defined which is a sheet for all the lines within a bundle. Pick tickets/labels may be defined which ticket for each line (has information of route, customer on it). A pre-printed pick label goes onto the part. In case of pick packs, a pack list may be defined.

Further, it may be determined if pick tickets are printed before or during the picking process. Validation requirements may be determined.

The unit of measure and abbreviations for dimensions, weights and volume for the facility may be defined. These parameters are used to control what unit of measure is displayed on screens and documents.

In the following, the functionality of the system according to an embodiment of the invention is described. The picking related functionality serves the user and the supervisor. The functionalities for the user are by nature related to picking assignment and execution. They comprise the following items:

Request bundle (bundle assignment)
Bundle execution:
    Provide execution instructions
    Confirm execution and exceptions
    Enable split bundle
    Enable re-sequence bundle
    Enable skip of pick items
    Enable integration of inventory count with the bundle execution (in the location the item is picked from)
Logon/logoff
Recovery The functionalities for the supervisor aim to enable control and monitor picking execution. These functionalities are integrated in the outbound WIP (work in progress) monitor:

Assign bundles to users
Split bundle
Merge bundles
Initiate emergency replenishment in non-RF environment
Monitor execution (refer to the outbound WIP monitor solution approach)
Monitor and control exceptions (refer to the outbound WIP monitor solution approach)
Assign equipments/equipment types to queues The functionalities are detailed individually. Functionalities which extend others, are detailed in the functionalities they extend (e.g. sequence bundle extends bundle execution, therefore it is discussed in the bundle execution).

Assign bundle (Bundle "Check Out").
Assignment in RF environment.

Bundle assignment to users can be done in manual or automatic modes. The supervisor typically utilizes manual mode, whereas automatic mode is used to assign bundles to equipments automatically, whenever they request for bundle assignment or continuously (after each bundle confirmation). The following parameters impact the decision-making regarding bundle assignment:

Picking completion time, which determines bundle priority
Bundle queue
Bundle HU types
Assigned HU types and queues for the equipment/equipment type, used by the user
Existing bundle assignments for the user
The first parameters to be checked prior to automatic bundle assignment, is existence of manually assigned bundles to the user for which assignment is to be done. If such assignments exist, they should be selected by bundle priority (i.e. by picking completion time), without further check.

In case where there are no existing bundle assignments, the system selects bundle for assignment. The relevant bundle population, which has to be analyzed, is:

Bundles, which where released for execution and available for picking (i.e. not in restricting statuses such as "hold"); and
Bundles, which are not assigned to other users; and
Bundles, which are flagged for RF execution.

The user can limit the bundle population from which the bundle selection is done. The user may select the bundle population from a menu, which will be available in the RF transaction. An example for selection population option could be a specific bundle queue. The bundle that will be selected is the bundle with the highest priority that belongs to one of the user equipment's queues. The bundle keeps the appropriate queue, and at the time of bundle assignment the queue is checked against the user equipment's queues. In addition, the HU type is one of the HU types assigned to the user. The equipment type that the user uses is taken into account too. It must be assigned to the bundle's queue and HU type.

The bundle assignment can be done automatically following logon (optional) and bundle confirmation. Whenever a user logs-off, all the assigned bundles are un-assigned. Note that analysis of bundle population is not a mandatory process. The user may select a specific bundle by scanning a specific HU or by specifying bundle number. The system will check to which bundle the scanned HU corresponds, and will assign the entire bundle to the user. The supervisor, in manual mode, can un-assign/assign bundles to users.

In a non-RF environment, the bundle is flagged to indicate that it is designated for printing. Assignment is not mandatory, however can be done in one of the following scenarios:

Scenario 1:
    After bundle printing the supervisor gives the papers (e.g. pick list/labels) a specific user and uses a desktop transaction to associate (assign) the bundle to the user. The assignment is traced with timestamp and allows rough control over bundle execution.
Scenario 2:
    Whenever a user takes the papers (e.g. pick list/labels) he uses a desktop transaction to associate the bundle to himself the same manner, which was mentioned above for the supervisor.

In non-RF environment, multiple bundles can be printed at once. The supervisor may select the multiple bundles for printing. The printing's timestamp is updated at the bundle header level. Re-printing is enabled followed by reason code and warning to indicate that the bundle was already printed.

Bundle execution—Bundle execution can take place in HU managed (HUM) environment and in non-HU managed environment.

In HUM environment, the HU is completely traced in two perceptions: material in HU and HU movements. As oppose to HUM, in non-HUM environment, the material movements are traced per material individually (i.e. not as a component of a specific unit). Therefore, HU number is irrelevant for operation. The stock in this case is managed by material quantity level in the warehouse bins.

Non-HUM environment can be determined at storage type level.

Bundle execution may take place in RF and non-RF environments. The standard processes vary between the two environments.

Standard process in RF environment—TO execution in RF environment includes four elements:
  Pick orders
  Verifications
  Timestamps
  Stock/HU update According to the embodiment of the invention as displayed in FIGS. 1 and 4, RF picking instructions are presented to the user who works with RF devices, whenever he requests work. Warehouse Orders, which are designated for non-RF environment, are flagged and printed by utilizing a desktop transaction. This enables picking execution in both RF and non-RF environments.

Warehouse order selection may be done in various manners: System-guided (may be limited to a specific population, such as queue if required) or user-guided. In both cases the resource qualifications and authorizations are checked.

User-guided selection can be done by selecting HU, warehouse order or warehouse request.

TO execution in RF environment may comprise four elements: Picking orders (i.e. instructions), verifications, timestamps, and stock/HU update. These elements are managed at the points in time which represent the basic picking operations:

Accuracy is achieved by the online data verification (i.e. bin, HU, material, quantity or batch), thus enabling better control over the picking process.

The transactions are designed to allow clear execution instructions and deals with all exceptions that might occur. In addition, the system supports a certain level of flexibility, during execution by enabling the resource to reverse the sequence of TOs, skip a specific TO, move TO to the end, choose from a list or even discontinue the execution.

The user may also trigger follow-up processes using exception codes in order to initiate replenishment TO or inventory counting.

As displayed in FIG. 1, usage of these elements is customizable and can occur at three points in time:

First, at the stage 10 of preparation (destination HU introduction): At this stage, the HU is introduced and placed on the equipment. In this stage, an operation 15 can be executed, which comprises verification of HU/HU type, timestamp of HU introduction and HU update (update HU location).

Second, at the source location 20: At this stage the material is picked from the source location/HU and placed on the equipment location (e.g. cart, pallet jack). In this stage, operation 25 can be executed, which comprises verification of source location, material, quantity and batch, Pick orders, timestamp of the picking operation and stock update (picking from source location and placement in the HU/equipment location if preparation was not done).

Third, at the destination bin 30: At this stage the HU is placed in the destination bin. In this stage, operation 15 can be executed, which comprises verification of the destination bin and destination HU, timestamp of the placement operation in the destination bin and stock update (picking the destination HU from the equipment bin and placement in the destination bin).

Figure 2:
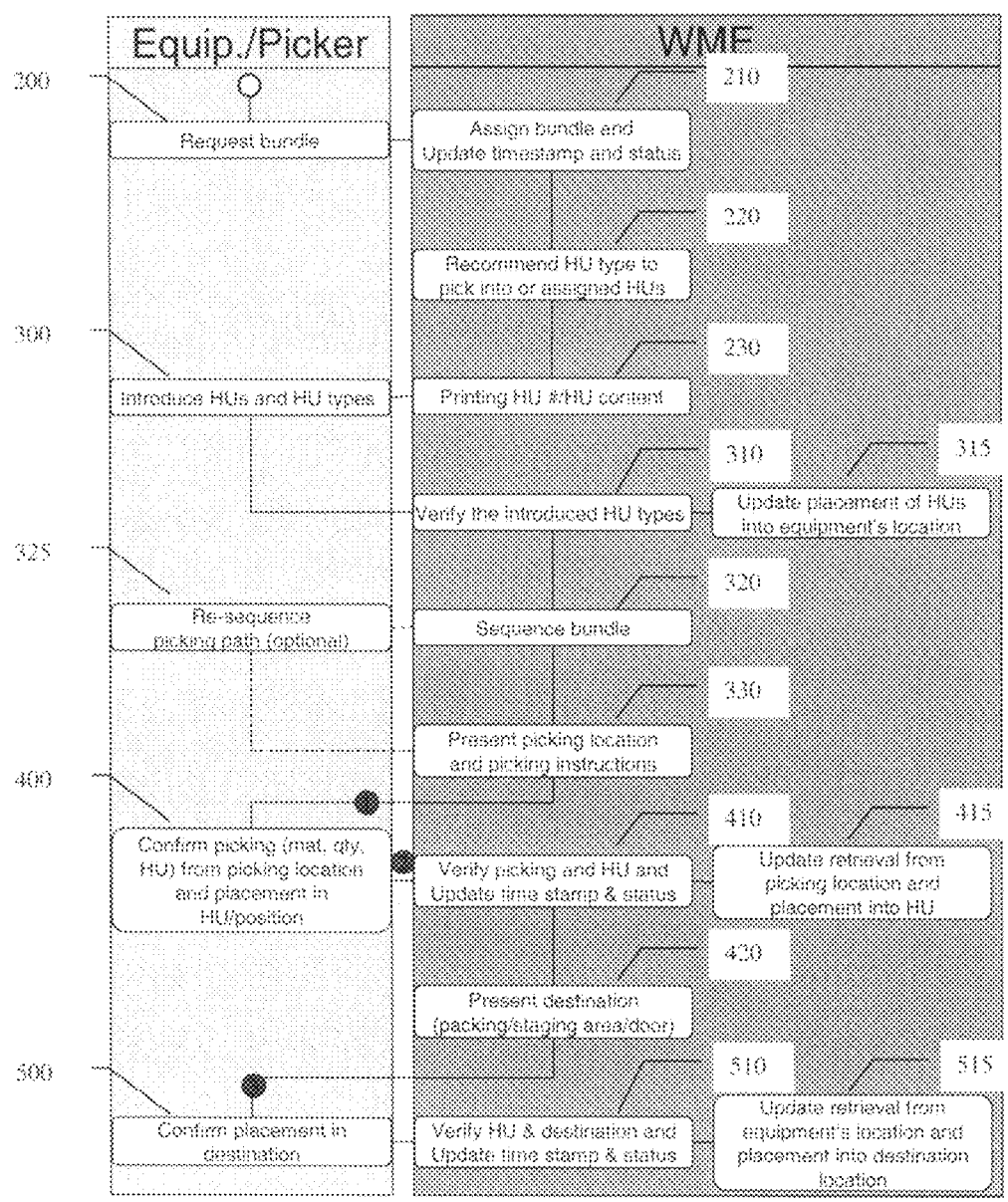
FIG. 2 illustrates an embodiment of the present invention implemented in an RF environment.

FIG. 2 represents a standard execution flow in an RF environment with no exceptions. Timestamp and stock/HU update are done at three bins as represented in FIG. 1, at the preparation bin 10, source bin 20 and destination bin 30. Verification profile has to be defined for each of the above-mentioned bins.

The bundle execution in RF environment starts after bundle assignment 210 and comprises the following operations, as represented in FIG. 2.

Introduction of destination HU and HU type—The user is instructed which destination HU he has to pick into if the HU was previously assigned at the bundling process. Alternatively, if the destination HU assignment is done at the time of picking, the system provides header data and recommends the HU types he could use and the required quantity, Operation 220. In case the system recommendation includes multiple destination HU types, the user will get the recommendation for the HU type. The user introduces the destination HU and its type and the physical/logical position it was placed in the equipment. The logical positions can be utilized in one of the following scenarios:

Scenario 1—Labeled position number. The cart contains numbers for each position. Whenever the user introduces an HU, he scans/types this number and the HU ID. Usually, the first pick items can be placed at any HU, and the next items are verified with reference to the first item. The system may present the HU # or/and position #, which is kept as an attribute of the HU. Note that this position is not maintained as a physical entity in the system. It is kept as a logical position attribute in the HU.

Scenario 2—Logical position assigned automatically by the system. The system sequentially assigns a number to the HUs, which are positioned on the equipment, by the sequence they were placed. It is kept as a logical position attribute in the HU. The verification is made in the same manner as described in scenario 1.

The user can override the system recommendation and introduce a different destination HU type, operation 300.

At this stage, the placement of the destination HU in the equipment's bin triggers stock update 315.

Printing can take place at this stage, prior to picking, or alternatively, can be done later, after the picking is completed. Both options should be configurable. Re-printing is possible at any stage.

If the customization is set up for automatic printing prior to picking, the following information may be printed:
  HU number labels for the destination HU
  HU content (if determined at the bundling stage)

It should be noted that the introduction of destination HU is irrelevant for scenarios where full pallet operations are involved (stand alone or clustered).

Pick from bins—The user is directed to the first picking bin and is instructed what should be picked, operation 330. Once the user confirms picking from the bin, operation 400, stock update 415 is triggered (i.e. retrieval from the picking bin and placement in the HU). If the customization is set up for automatic printing than at this stage the following information could be printed:
  Pick label
  Shipping label In case where picking is done for multiple destination HUs, the system presents the destination HU and the logical position in the equipment, in which the picked item should be placed, operation 420. The user confirms placement in destination HU/logical position, operation 500. The confirmation of placement in the HU triggers stock update, operation 515.

The destination HU can be verified (operation 510) to ensure the material was placed in the appropriate HU by adding destination HU to the verification profile at the source bin (see FIG. 1). At the source bin the user would have to scan the picked HU/material and the destination HU. The system has to verify that the material was placed in the appropriate HU. In case the user placed it into the wrong destination HU, the system instructs him to take it out again, and place it into the correct destination HU.

FIG. 2 describes confirmation of one picking bin (400, 500). For multiple source bins, the flow is similar. The operations from the point 330 "Present picking bin and pick orders" until point 415 "Update retrieval from picking bin and placement into destination HU" are repeated consecutively for all the source bins.

The required data verification at the source bin can be determined in picking area level or if the verification must be specified at user level. Status and timestamp are updated and stock update is done for the retrieval from the picking bin and placement in the destination HU or equipment bin (if destination HU was not introduced).

Sequence bundle (see again FIG. 2)—The bundle is presented sequenced by the pick path, which is pre-defined in the picking area. The user has the following re-sequencing options, at operation 325, that he can utilize prior to any TO execution:

Reverse sequence
Display list
Move a specific TO to the end of the bundle sequence.

Reverse sequence—The sequence can be changed for the whole bundle at any stage manually from ascending to descending and vice-versa.

Display list—The user can trigger a display of TO list. In this case, the bundle's TOs will be displayed and he would be able to choose from the list a specific TO he wishes to execute.

Move TO to the end—Move the presented TO to the end of Bundle. The TO will be re-sequenced to the end of the bundle to be executed last.

Skip TO—The user can skip a TO as part of normal execution (user preferences). This operation will move the TO one picking sequence forward and the next TO will presented.

Split bundle (refer again to FIG. 2)—The user can discontinue the picking at any time due to various reasons such as full destination HU, break etc. and indicate the reason code to trigger the bundle split. The user has an option to keep the split bundle assigned to him.

Inform remaining quantity in bin (refer again to FIG. 2)—Following the update of retrieval from the picking bin at operation 415, the system can trigger stock count in the picking bin. The count is triggered by WME in case the quantity is equal or drops below the threshold, which is defined at material level. A tool for mass update in the material master will be provided. The tool will enable update by specified criteria, which can be any of the material master attributes. For further information regarding the available attributes.

The user will have to report the actual quantity in the picking bin. The execution of the counting is traced in WME, which updates timestamp and the user who performed the counting. The counting result can be addressed to the stock update for immediate update of stock. In addition, in case differences were encountered, WME may trigger inventory count. This functionality is enabled only in RF environment.

Initiate replenishment—Following report of stock discrepancy (exception) by the user, emergency replenishment is triggered. For detailed information related to replenishment, please refer to the replenishment solution approach. The replenishment initiation is seamless to the user.

Place in destination bin (packing/staging area/door)—After the picking is completed, the destination is presented to the user. The user can override the planned destination bin. At this stage the verification is done based on the verification profile, timestamp and status are updated. The stock is updated as follows: HU picking from equipment's bin and HU placement in the destination bin.

Figure 3:
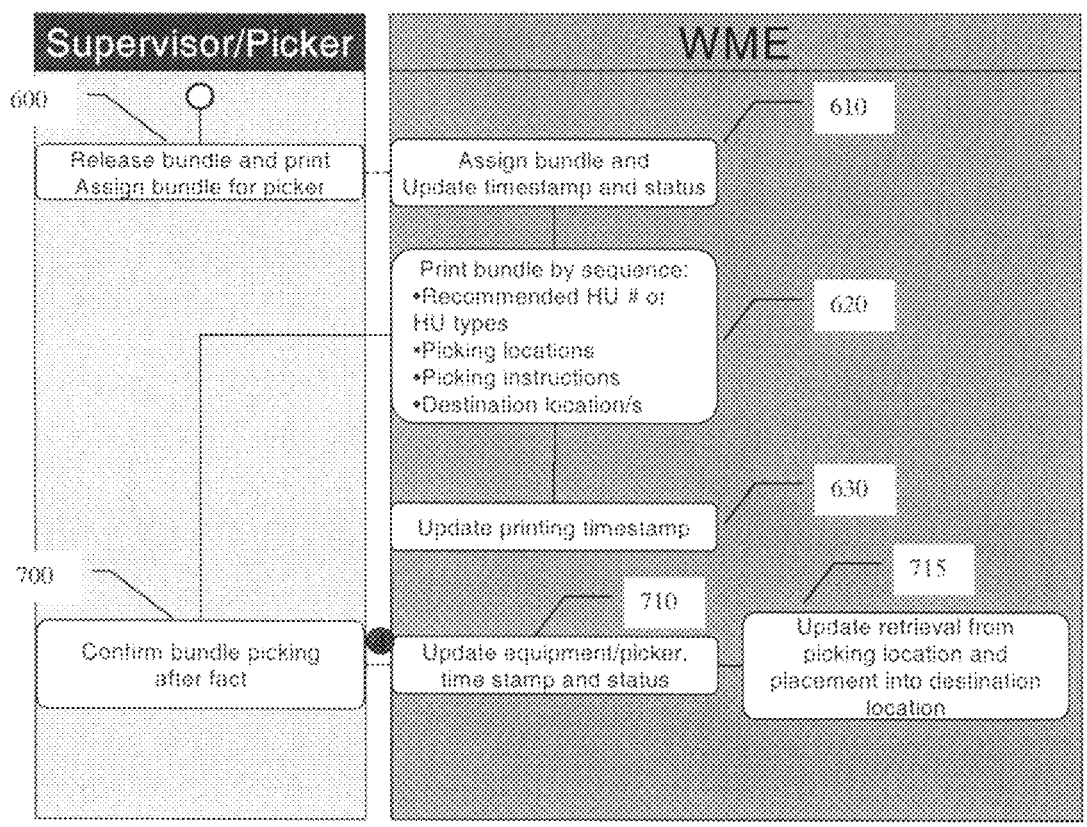
FIG. 3 illustrates another embodiment of the present invention implemented in a non-RF environment.

FIG. 3 details a standard bundle execution in a non-RF environment. Non-RF environment by nature is a batch operation, hence, is limited from tracking and stock visibility perspectives. The bundle execution in non-RF environment starts after bundle printing, operation 600, and the following consecutive operations:

Bundle assignment 610 (Bundle "Check Out")—The manager may assign the bundle to a specific user prior to printing. This is an optional operation.

Print bundle 620 by sequence—The bundle is printed by the appropriate sequence (determined by the pick path) and may comprise:

Header data
Recommended destination HU types to pick into and pre-assigned HUs. HUs will be pre-assigned by customer with or without utilizing weight and volume checks (i.e. planned HU). In case where the assigned HU is not sufficient, additional HU can be introduced, or alternatively the assigned HU can be extended physically. The list of allowed HUs can be provided based on route determination (refer to bundling and packing SA).
Picking bins
Pick orders (e.g. material, quantity etc.)
Destination bin/s
The required printouts are defined in customization. The following options are valid:
HU label
Pick label
Shipping label (for. pick pack process)
HU content (if defined by the bundling module).
At operation 625, update printing timestamp is done.
Confirm bundle picking 700 (Bundle "Check In")—The bundle confirmation can be done prior to bundle execution or at different stages of the bundle execution. The following options are valid:
At bundle creation: The bundle can be automatically confirmed at creation time. The bundles, which have to be automatically confirmed, will be determined based on customization by picking area and WM process type.
At the check out point: When the supervisor assigns bundle he can print and confirm it.
At the check in point: After bundle execution.
At packing time: When the bundle's picked items are packed in a handling unit, the corresponding picking TOs can be automatically confirmed. This confirmation takes place at the packing location, which may be the packing station or the staging area.
Differences may be reported as well. They can be reported immediately using a desktop transaction, to resolve the exception as soon as possible, or alternatively, they can be reported when confirmation is done, in a cumulative manner. In case no exception is involved and only one destination HU must be confirmed, confirmation can be done at bundle level.

The confirmation does not trace the users/equipment activities. It updates the timestamp of confirmation, the user/equipment who executed the bundle and differences, see operation 710. Stock is updated regarding retrieval from the picking bins, HUs' contents and placement of HU in the destination bins. The confirmation of bundles is done using desktop transaction.

UI for reporting exceptions and confirmations of bundles is provided and follows similar processes/functions of confirmation and exception as if it is reported in the RF environment. Mass bundle confirmation is enabled. Automatic confirmation can take place at bundle creation. In this case, printing and bundle assignment to users will be controlled and managed manually.

Logon/Logoff—Users can logon to specific devices, which are mounted on equipment, or logon to their own device when working without equipment. Once the logon is completed, the user ID is updated as an attribute of the equipment and the user can start requesting bundles (i.e. bundle assignments).

Logoff can be done after bundle confirmation (may be partially confirmed as well). The user must specify the reason code for logging off. The system must record the status change, reason code and timestamp and an-assign the user from the equipment.

Recovery—Recovery should be handled in the following manner. In case where the user is assigned to a bundle, the recovery will present the assigned bundle, whereas in case where no bundle is assigned, a new bundle will be selected.

In one embodiment of the present invention, procedures for exception handling are provided. Bundle execution exceptions can be categorized into three types:
  Stock related exceptions—caused due to stock discrepancies
  Storage related exceptions—caused due to discrepancies in storage bin
  Human related exceptions—caused due to human reasons.

Discrepancy means that actual stock or storage bin status differs from the expected (i.e. recorded in the system).
  Possible stock discrepancy reasons are:
  Damaged stock/source HU
  Lost stock (i.e. incorrect stock quantity)
  Wrong Stock attributes such as Material ID, Lot, and Expiration date.
  Possible storage discrepancy reasons (for picking) are:
  Inaccessible bin (i.e. TO cannot be executed).
  Possible human reasons are:
    Not enough capacity to complete bundle execution (e.g. full destination HU, no room in equipment)
    Break interrupts bundle execution
    Logoff (end of shift) interrupts bundle execution.

Exceptions impact warehouse activities and require some corrective actions to allow continuation of normal warehouse operation. Exception is triggered by the user or internally as a result of stock or storage status changes. The user is obliged to report an exception whenever the bundle execution cannot be completely accomplished. The exception is expressed by specifying the reason code. The exceptions can be traced by logging the reason code, timestamp and user who reported the exception. Corrective actions include analyzing substitute operations (e.g. picking from other bin, trigger replenishment etc.) to resolve the operation that could not be fulfilled. Next operation typically deals with the exception in a global manner to avoid additional occurrences during other bundles' executions. The exceptions are handled by the process, which was defined for the specific reason code. The administrator, up to a certain degree of freedom, can customize the required corrective actions for a specific reason code. The corrective actions for stock discrepancies are categorized by reason code. Possible corrective actions for "Lost stock" include:
  Update stock in bin
  Block material in a bin
  Allocation of new picking bin: This process operation is performed by location determination module. If new allocation is done in the same picking area, it will be assigned to the same user and the bundle will be re-sequenced. Otherwise it will be assigned to a new bundle
  Trigger inventory count
  Trigger replenishment
  Allocate new picking bins for other bundles.

The possible corrective actions for "Damaged stock/source HU" and "Wrong stock attributes" include:
  Update stock attributes in bin
  Block material in a bin
  Allocation of new picking bin
  Move stock to damage area
  Trigger replenishment
  Allocate new picking bins for other bundles.

The possible corrective actions for storage discrepancies (i.e. inaccessible bin):
  Allocation of new picking bin
  Block bin (change status and generate a message): Unblock when bin becomes accessible
  Allocate new picking bins for other bundles.

The possible corrective action for human related exceptions includes a split bundle.

Allocation of new picking bin—The allocation of new picking bin is the most common process used for stock discrepancies and storage related discrepancies (i.e. bin denial). This process operates in the following manner:
  Seek for an alternate bin in the same picking area
  If found: A new TO will be generated and added to the existing bundle and re-sequenced.
  The user will have the following options:
  Execute the new TO
  Sequence bundle—in this case the new TO will be sequenced according to the pick path
  Utilize any of the sequencing options
  If not found: WM Request line will be rescheduled in the standard process (wave assignment, TO creation and bundling).
  If TO was not created: It is a pick denial scenario. The flag that indicates, whether the host system should be informed immediately, should be checked and react accordingly. I.e. a message to update the reference document will be created and distributed to the host system.

Split bundle—The functionality of bundle splitting enables the supervisor fine-tuning of bundle management at the warehouse based on managerial decisions. The splitting enables parallel work on the same bundle to balance workload among users in order to minimize picking cycle times. The splitting can be done also in the background whenever the user discontinues the bundle picking and indicates the reason code. This enables assignment of the remaining non-picked bundle to another user. The user has an option to keep the split bundle assigned to him. This type of splitting is a technical procedure, to allow continuation of bundle execution. Split bundle results in generation of new bundle/s, which inherits most of the attributes from the bundle it was split from. Only calculated attributes such as total weight (if it will be maintained at the header) will be updated.

Merge bundles—This function is based on the following assumptions:
  The merging can be done if execution had not started yet
  The merge will utilize the existing bundling process (same rules).
  Merging of bundles is enabled in the following manner:
  The user will select the bundle/s he wishes to merge and indicate the bundle he wishes to merge with. This bundle will determine the wave, which the merged bundles should be associated with
  The system will cancel all the selected bundles
  The user will indicate the bundle name/rule he wishes to use for re-bundling.

A variant can be used at transaction level to use a default merge rule.

Assignment of equipment/equipment types to queues—Queues define movements by which the work (e.g. TOs/bundles) in the warehouse is managed and assigned. The queue definition is comprised of physical areas in the warehouse (e.g. picking area) physical objects to be moved (e.g. HU type) and WM process type.

All the parameters are optional. For example, queue can be defined for a specific picking area, which is a source execution area without a specific indication of destination storage type, WM process type and HU type.

One picking device only should be specified per each queue (RF/paper).

The supervisor should define the queues based on qualifications and managerial rules that will reflect the required warehouse operation behavior. Once the queues are defined, he can assign equipment/equipment types to queues. Each user/equipment can be assigned to multiple queues.

In order to assure that the bundling rules will not contradict the queue definitions, the queue definition must be embedded in the bundling rules.

The queues enable management of bundle execution by:
  Enabling workload distribution and balancing by setting the working environment in a structured manner (i.e. defining queues and assignments dynamically).
  Restriction of work at specified areas to a certain equipment/equipment type for better execution control.

Figure 4:
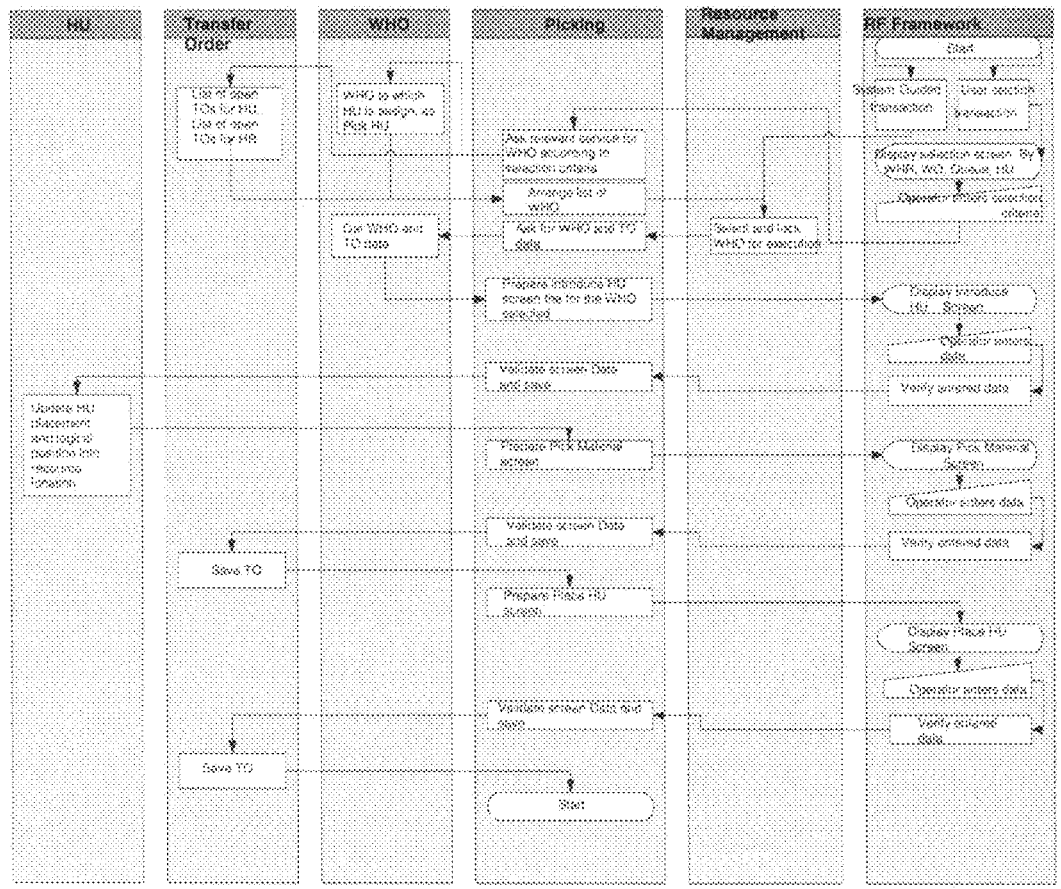
FIG. 4 illustrates a general view of picking according to the invention.
Figure 5:
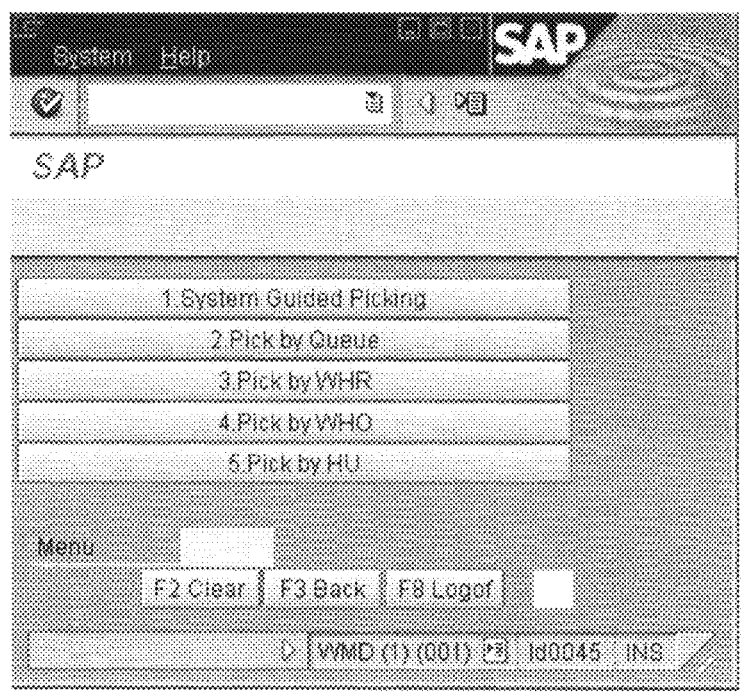
FIGS. 5-11 illustrates, by way of example, prints of exemplary screens displayed on an RF device as used in the present invention.

FIG. 4 illustrates a general flow of the processing according to the present invention.

FIGS. 5 to 11 illustrates, by way of example, screens as displayed on RF device used in the present invention. By selecting the picking menu from the main RF menu, the user will be forwarded to the selection menu in which he will be able to select one of the following options:
  system guided picking.
  system guided picking by queue.
  picking by WMR.
  picking by WO.
  picking by HU number.

Figure 6:
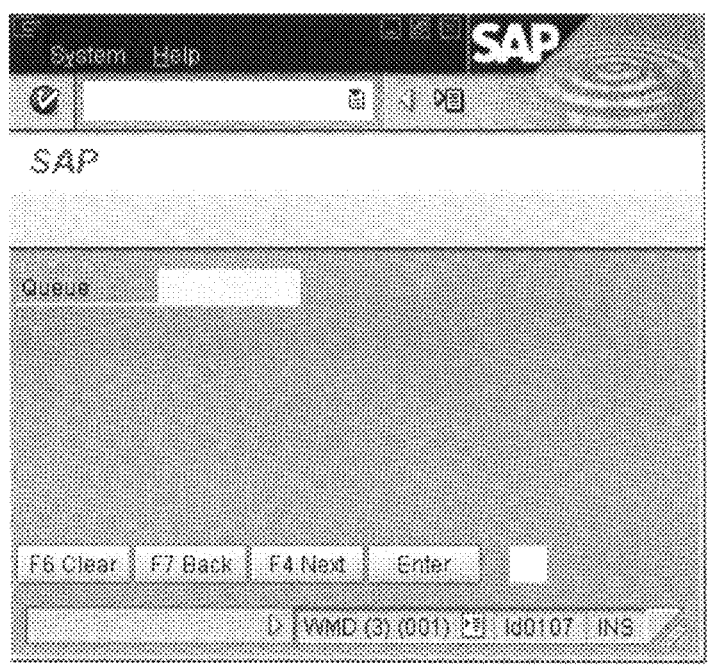
Figure 7:
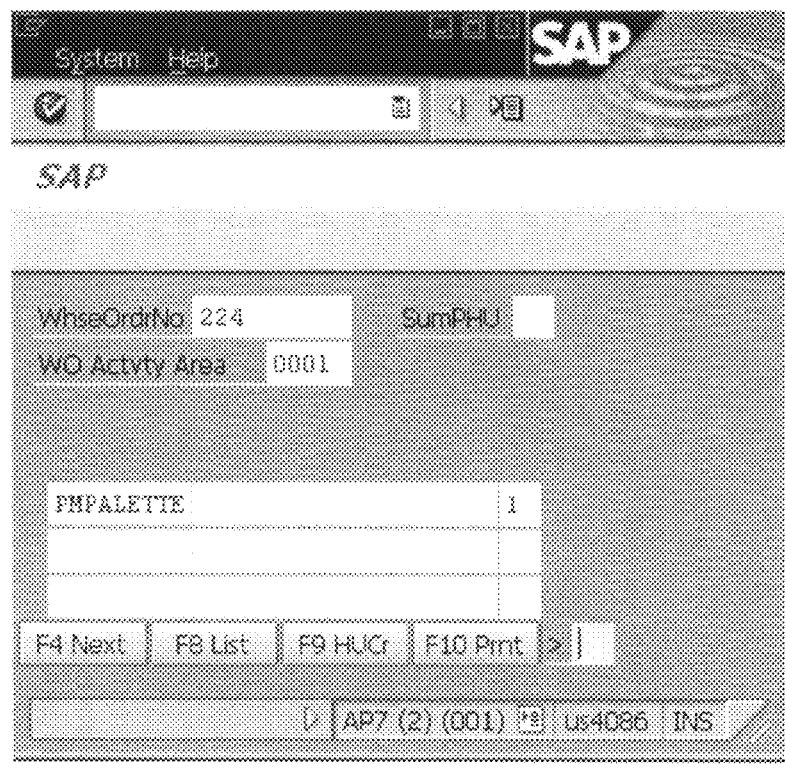
Figure 8:
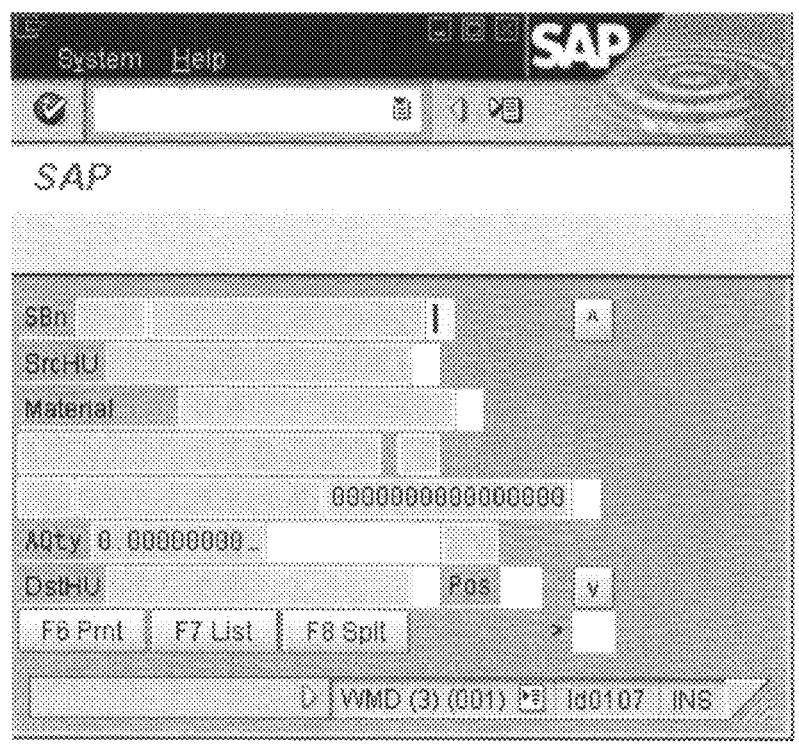
Figure 9:
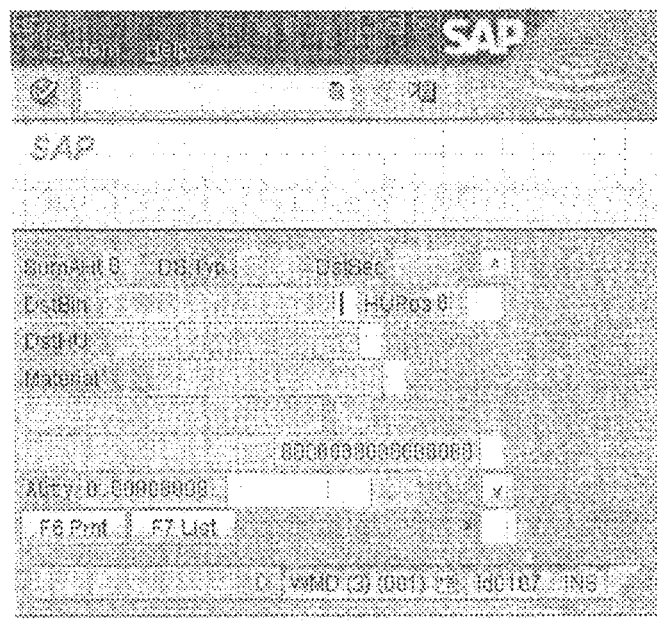
Figure 10:
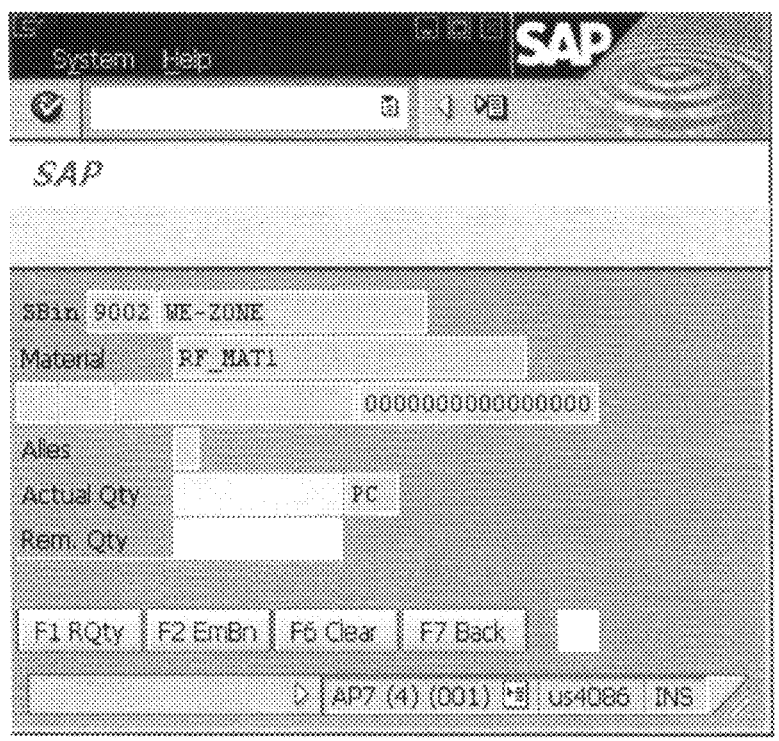
Figure 11:
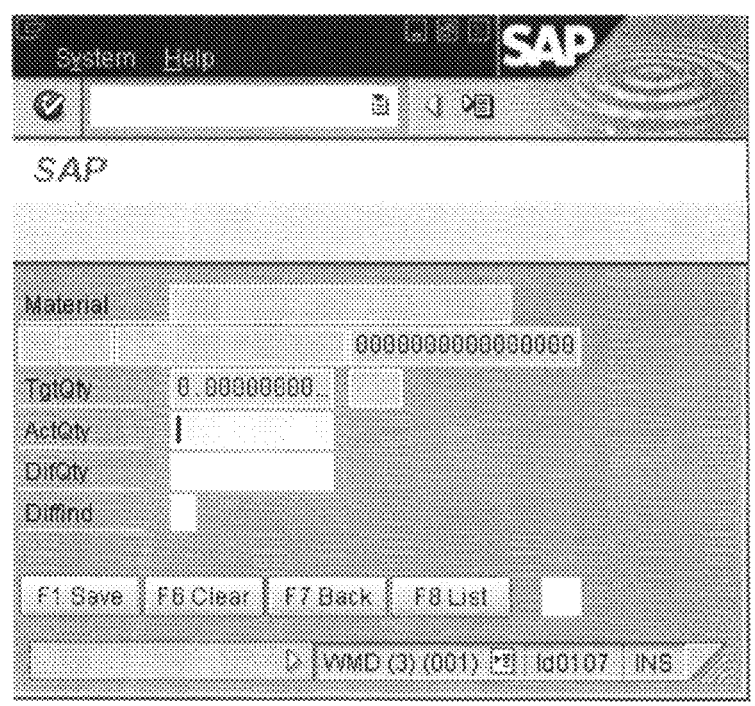

FIG. 6 illustrates the screen of the menu picking by queue. FIG. 7 illustrates the Pick-HU introduction screen. FIG. 8 illustrates a source pick material screen. FIG. 9 illustrates the place material screen, FIG. 10 illustrates the stock check screen, and FIG. 11 illustrates the difference screen.

In the following, data objects needed for implementing the system of the present invention are described. The following data objects are defined to realize the required picking functionality:
  Bundle (warehouse order)—Bundle is the header of group of TOs. It must contain four types of information:
    Selection related—Information that impact bundle selection such as queue, picking completion time, status, assignment to user/equipment.
    Execution related—Information that provides information at execution such as planned destination bin, assigned destination HUs, recommended destination HU types and quantities. The planned destination bin determines the current destination bin the bundle is aiming to. It is required since a bundle might have multiple destinations in a row (e.g. packing area and door). The bundle can be directed to one specific warehouse destination bin. Once it had reached this destination bin it can continue to the next destination bin (one destination bin at the time). The final destination (Staging Area) is determined in the Bundling process or in the Manual Wave Release process. The user can skip the next destination and can proceed to the final destination.
    Informative data—Information that is used for controlling and monitoring such as wave.
    Execution log data—Information, which trace the bundle life cycle such as status, timestamp, equipment and actual destination bins.
  Transfer Order (TO)—TO must point to the bundle it is related to. It must contain three types of information:
    Bundle related—Information that impact bundle generation and assignment to queues such as HU type, bin access etc.
    Execution related—Information that provides information at execution such as pick bin, HU number (planned) and pick orders.
    Execution log data—m Information, which trace the bundle life cycle such as status, timestamp, user and actual destination HU the item was picked into and the actual picking info (e.g. material, quantity, HU, batch, pick bin).
  HU type.
  Warehouse process type.
  Storage type.
  Customization.

Printing-related customization is done at picking area level. Three types of information should be defined:
  Printing picking operation (i.e. timing)—Can be set in different operations of the picking process.
  Multiple operations for printing may exist for a specific picking area (e.g. before, during or at the end of the picking process).
  Printing formats per picking operation—Required data, which has to be bar-coded is an implementation issue.
    Pick label list—label for each TO.
    HU content List—list of all the TOs within HU.
    Bundle content list—list of all the TOs within a bundle.
    HU label number—number of destination HU.
    Shipping label (customer, ship address etc.).
    Multiple printing formats may exist for each timing (e.g. pick label, HU label #, HU content list).
  Printing content per format—The printing content per printing format is an implementation issue and defined at the implementation phase. The content of the printing format may include text instruction, which exists in the material master or/and WM Request. Additionally, instructions for banded material operation, which are defined at the material level, can be included in the format's content. List of allowed HUs can be provided based on route determination (refer to bundling and packing SA).
  Printer per printing format—A general flexible printing mechanism is provided.
  Pick orders—The pick orders in RF environment should be defined per process operation at picking area level. The instructions are based on the TO and may include text instruction, which exists in the material master, hazardous material master or/and WM Request. Additionally, text instructions for banded material operation, which are defined at the material level, can be included.

Pick orders may include information such as: handling unit type, number of HUs, special instructions, material, quantity, carrier, route, customer code, packing lane or staging area (if applicable), bundle number, etc. These pick orders would be displayed on both RF and non-RF tags (including a header tag).

Determine picking device—Determine the picking device at picking area or queue level (RF/paper). In case both are defined, the picking device, which was defined at the queue level, will override the picking area definition.

Determine verification requirements—Determine verification profiles and assign profiles at operation level for each picking area. For material verification, a flag should be added at material level, to indicate if the material cannot be verified (i.e. scanned). This flag is set at the packaging material level. In case where the verification determination requires material verification, which cannot be scanned, this requirement will not be active.

Flag for reporting pick denial—This flag is defined for the warehouse at warehouse process type level. It indicates whether pick denial should be immediately reported to the CRM/APO through the WMR reference delivery.

Create picking area by operational class—Create picking area by WM request type.

Assign picking location to area and determine picking path—Process of assigning locations into an efficient picking path.

Specify Area, Aisle within area, section within aisle and level within section. Area and aisle must be specified. No entry in section and level assumes all sections and levels within the aisle(s) specified. Aisle—start stop and direction in aisle, Section—start stop and direction in section. Specify whether to use the odd, even, or both sets of locations in an aisle. Specify whether to always process sections in the pre-determined order or to alternate from High-to-Low then Low-to-High when changing from one aisle to the next. Level—start stop and direction in level.

Bundle statuses and indicators—In order to assure that bundle execution will be tracked as tightly as possible, the statuses/indicators, timestamps and supervisor/user who derived the status/indicator change, is maintained at bundle level and at TO level.

The following statuses are maintained at bundle level:
Available: Available for execution
Assigned: Indicates if the bundle is assigned to a specific user. The bundle may be automatically assigned, when the user requests a bundle or manually assigned by the supervisor. An indicator distinguishes both assignments. Manually assignment can be un-assigned by the supervisor if execution had not started yet, whereas automatic assignment cannot be unassigned by the supervisor.
Confirmed: The bundle was executed.
Cancelled: The bundle was cancelled and sent for re-bundling.
Hold: This status holds bundle execution.
Additional indications, which should also be traced by timestamps and supervisor/user.
Creation time and date.
Split: Indicates the bundle was split.
Printed: Indicates that the bundle was printed.
The following statuses should be maintained at planned TO level:
Available—Available for execution.
Confirmed—Executed.
Cancelled.
Hold: This status holds TO execution.
Partially confirmed (i.e. split): Partially confirmed is used when a TO must be split due to confirmation of partial quantity for example.

The presentation layer provides a significant amount of flexibility by enabling the customer freedom to change the way screens appears. Lack of space, which is considered the biggest problem in the small screens of RF devices and PDAs, is now solved in many different ways. Thus, the customers can give away optional fields, or they may erase push-button arrays—either by just not presenting them or using the button functionality to scroll between the available pushbuttons.

The push-buttons, as well as the screen fields, are generated on the fly according to various parameters, as for example personalization, process, etc.

Each screen is inherently composed of two distinct parts: Template and sub-screen. While the templates define the physical screen size and push-button layout, the sub-screens contain the application data fields.

The following functionalities are customizable:
Menus and menu trees.
Personalization profiles.
Display profiles and physical screens.
Processes.
Function codes and pushbutton texts.
Verification profiles.
Business flow logic.
Fixed values (like plant etc.).

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method operations according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

Further embodiments are in the scope of the following claims.

The invention claimed is:

1. A computer-implemented method of controlling picking operations of a number of users in a warehouse, comprising:
presenting a sequence of picking instructions for a picking operation online individually to the number of users via an instruction presentation device associated with the respective user, each picking instruction specifying a handling unit (HU) for goods to be transferred, a picking equipment to be used, a source location of the goods and a destination location, the HU being a container for storing and transporting the goods, and the picking equipment being a tool for transferring the HU;
accepting online data verification of the HU and the goods picked;
changing a subsequent picking instruction in the sequence in response to a selected one of a set of resequencing options that are available to the users; and
presenting the changed sequence of picking instructions to the users;
wherein the picking operation includes introducing the goods into the HU at the source location, placing the HU on the picking equipment, and transferring the HU to the destination location,
wherein the set of resequencing options include reversing the sequence of the picking instructions.

2. The method of claim 1, wherein a number of picking areas are defined in the warehouse, each picking area comprising a predefined group of locations, and each user is assigned to work in at least one of the picking areas.

3. The method of claim 2, wherein the picking areas are defined according to the type of instruction.

4. The method of claim 1, wherein the instruction presentation device is one of a radio frequency (RF) device, personal digital assistant (PDA), computer screen, paper list, or paper tag.

5. The method of claim 2, further comprising:
assigning a bundle of picking instructions produced in sequence, to be executed by one user for a given picking area.

6. The method of claim 2, further comprising:
sorting the bundle of instructions into a picking sequence to be executed by a group of users.

7. The method of claim 5, further comprising:
recording a timestamp when a bundle is assigned to a user.

8. The method of claim 5, further comprising:
recording a timestamp when an instruction is executed by a user.

9. The method of claim 2, further comprising:
receiving from the user a proposed specific HU to be used for specific picking instructions.

10. The method of claim 1, further comprising:
assigning an identifier (ID) to the HU.

11. The method of claim 1, further comprising:
directing a user to the source location;
receiving a confirmation from the user that the user is at the correct location;
displaying a picking instruction to the user, the picking instruction including material number, HU number, unit of issue, pack-with, position on a cart for the material to be placed in, and quantity;
receiving a verification from the user that the material is present at the source location;
receiving a confirmation that the material is picked by the user;
instructing the user to count the quantity of remaining material at the source location, and
recording the destination location to which the user moved the HU.

12. The method according to claim 1, further comprising:
receiving notice that the HU is full; and
creating a further HU for a remaining quantity after recording the destination location of the HU, if the HU is not large enough for the whole quantity of material to be picked.

13. The method according to claim 12, wherein the online data verification is performed using scanning of barcodes on the goods.

14. The method according to claim 1, further comprising:
recording an exception responsive to the existence of a condition, the exception indicating at least one of:
insufficient location
insufficient stock
wrong part in location
mixed stock
overfill for scrap.

15. The method according to claim 1, further comprising:
reinserting a picking instruction at a later position in a picking sequence responsive to shipping of the picking instruction by a user.

16. The method according to claim 2, further comprising:
receiving a confirmation issued by the user upon completing a bundle of picking operations.

17. A non-transitory computer readable storage medium comprising instructions that when executed by a computer cause the computer to:
present a sequence of picking instructions individually to a number of users via a presentation device associated with the respective user;
accept verification related to the picking instruction from the users; and
change a subsequent picking instruction in the sequence in response to a selected one of a set of resequencing options available to the users,
wherein the set of resequencing options include reversing the sequence of the picking instructions.

18. The method according to claim 1, wherein the resequencing options further include moving a picking instruction to an end of the sequence and splitting the sequence.

19. The non-transitory computer readable storage medium according to claim 17, wherein the resequencing options further include moving a picking instruction to an end of the sequence and splitting the sequence.

* * * * *